United States Patent
Chae et al.

(10) Patent No.: US 10,746,262 B2
(45) Date of Patent: Aug. 18, 2020

(54) POWERTRAIN FOR VEHICLE

(71) Applicants: Hyundai Motor Company, Seoul (KR); Kia Motors Corporation, Seoul (KR)

(72) Inventors: Min Ho Chae, Incheon (KR); Yong Uk Shin, Suwon-si (KR); Soon Ki Eo, Ansan-si (KR); Sun Sung Kwon, Anyang-si (KR); Chon Ok Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/255,598

(22) Filed: Jan. 23, 2019

(65) Prior Publication Data
US 2020/0116235 A1    Apr. 16, 2020

(30) Foreign Application Priority Data
Oct. 15, 2018    (KR) .......................... 10-2018-0122709

(51) Int. Cl.
*F16H 3/66*    (2006.01)

(52) U.S. Cl.
CPC ............ *F16H 3/66* (2013.01); *B60Y 2200/91* (2013.01); *F16H 2200/0021* (2013.01); *F16H 2200/2005* (2013.01); *F16H 2200/2007* (2013.01); *F16H 2200/2033* (2013.01); *F16H 2200/2064* (2013.01); *F16H 2200/2094* (2013.01)

(58) Field of Classification Search
None
See application file for complete search history.

(56) References Cited

U.S. PATENT DOCUMENTS

| 2,331,684 | A | * | 10/1943 | Henningsen | F16H 3/54 475/299 |
| 3,250,150 | A | * | 5/1966 | Stockton | F16H 3/66 475/56 |
| 3,503,282 | A | * | 3/1970 | Peterson | F16H 3/66 475/276 |
| 3,541,886 | A | * | 11/1970 | Bookout | F16H 3/66 475/285 |
| 4,569,252 | A | * | 2/1986 | Harper | F16H 3/78 475/299 |
| 6,579,205 | B2 | * | 6/2003 | Williams | B60K 17/3467 475/204 |

(Continued)

FOREIGN PATENT DOCUMENTS

KR    10-2012-0118925 A    10/2012

*Primary Examiner* — Justin Holmes
(74) *Attorney, Agent, or Firm* — Morgan, Lewis & Bockius LLP (57) ABSTRACT

A powertrain for a vehicle may include a first planetary gear set configured such that a first rotation element of three rotation elements thereof is connected to an input shaft; and a first clutch device and a second clutch device provided in series between a second rotation element and a third rotation element of the first planetary gear set to directly connect the second rotation element and the third rotation element, wherein the second clutch device is configured to selectively lock the third rotation element; and the second rotation element of the first planetary gear set functions as an output element of the first planetary gear set.

13 Claims, 9 Drawing Sheets

(56) References Cited

U.S. PATENT DOCUMENTS

2009/0247346 A1* 10/2009 Hvolka .................... F16H 3/54
   475/155
2017/0089437 A1* 3/2017 Arnelof ................ F16H 37/046

* cited by examiner

POWERTRAIN FOR VEHICLE

CROSS REFERENCE TO RELATED APPLICATION

The present application claims priority to Korean Patent Application No. 10-2018-0122709, filed Oct. 15, 2018, the entire contents of which is incorporated herein for all purposes by this reference.

BACKGROUND OF THE INVENTION

Field of the Invention

The present invention relates generally to a powertrain for a vehicle. More particularly, the present invention relates to a configuration of a powertrain that can be used in an electric vehicle or the like.

Description of Related Art

An electric vehicle is driven by the power of a motor, and can sufficiently realize the driving characteristics required for a vehicle, such as the maximum gradability of a vehicle and the maximum speed driving ability, while reducing the motor capacity by use of a transmission.

Furthermore, the transmission of a vehicle is configured to consume as little power as possible during the implementation of a specific gear stage, to improve the power transmission efficiency of the transmission and ultimately increase driving range of a vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a powertrain for a vehicle, in which two gear stages are provided to sufficiently realize the driving characteristics required for a vehicle while reducing the capacity of a motor mounted to the vehicle, and the power transmission efficiency of a transmission is improved by minimizing the power consumed in the implementation of the gear shift, ultimately improving fuel efficiency of the vehicle and increasing the driving range.

In various aspects of the present invention, there is provided a powertrain for a vehicle, the powertrain including: a first planetary gear set configured such that a first rotation element of three rotation elements thereof is connected to an input shaft; and a first clutch device and a second clutch device provided in series between a second rotation element and a third rotation element of the first planetary gear set to directly connect the second rotation element and the third rotation element, wherein the second clutch device is configured to selectively lock the third rotation element; and the second rotation element of the first planetary gear set functions as an output element of the first planetary gear set.

The second clutch device may be configured to implement a state of locking the third rotation element while being connected to the first clutch device or being released from the first clutch device.

The second clutch device may be configured to implement a state of directly connecting the second rotation element and the third rotation element with each other while the first clutch device is engaged therewith or released therefrom.

The first planetary gear set may be constituted by a single pinion simple planetary gear set; and the first rotation element may be constituted by a first sun gear, the second rotation element may be constituted by a first planet carrier, and the third rotation element may be constituted by a first ring gear.

The first clutch device may be provided to be connected to the second clutch device through a rotating body rotating in a concentric manner with the input shaft; and the first clutch device may be constituted by a friction clutch configured to continuously vary a frictional force between the rotating body and the first planet carrier.

The second clutch device may include a sleeve configured to linearly slide along an axial direction of the input shaft; the sleeve may be provided to sequentially select positions of "1D-1-N-2" gear stages by linearly sliding; and the sleeve may be configured such that an external circumferential surface thereof is provided with a first external sleeve gear and a second external sleeve gear disposed in a predetermined interval along the axial direction thereof, and an internal circumferential surface thereof is provided with an internal sleeve gear.

With the sleeve at the 1D gear stage, the internal sleeve gear may be engaged with a first clutch gear connected to a transmission housing, and the second external sleeve gear may be engaged with a third clutch gear connected to the first ring gear; with the sleeve at the 1 gear stage, the internal sleeve gear may be engaged with the first clutch gear, the first external sleeve gear may be engaged with a second clutch gear provided in the rotating body, and the second external sleeve gear may be engaged with the third clutch gear; with the sleeve at the N gear stage, the first external sleeve gear may be engaged with the second clutch gear and the third clutch gear; and with the sleeve at the 2 gear stage, the first external sleeve gear may be engaged with the second clutch gear and the third clutch gear, and the internal sleeve gear may be engaged with a fourth clutch gear connected to the first planet carrier.

The sleeve may be slidable along the axial direction of the input shaft by a shift fork driven by an actuator.

The second clutch device may be constituted by a mesh type clutch to realize power transmission by gear engagement.

A motor may be connected to the input shaft; a second sun gear of a second planetary gear set may be connected to the first planet carrier; a second ring gear of the second planetary gear set may be fixed to the transmission housing; and a second planet carrier of the second planetary gear set may function as an output element of the second planetary gear set.

According to an exemplary embodiment of the present invention, it is advantageous in that two gear stages are provided to sufficiently realize the driving characteristics required for a vehicle while reducing the capacity of a motor mounted to the vehicle, and the power transmission efficiency of a transmission is improved by minimizing the power consumed in the implementation of the gear shift, ultimately improving fuel efficiency of the vehicle and increasing the driving range.

The methods and apparatuses of the present invention have other features and advantages which will be apparent from or are set forth in more detail in the accompanying drawings, which are incorporated herein, and the following

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinbelow, an automatic transmission for a vehicle according to an exemplary embodiment of the present invention will be described in detail with reference to the accompanying drawings.

Figure 1:
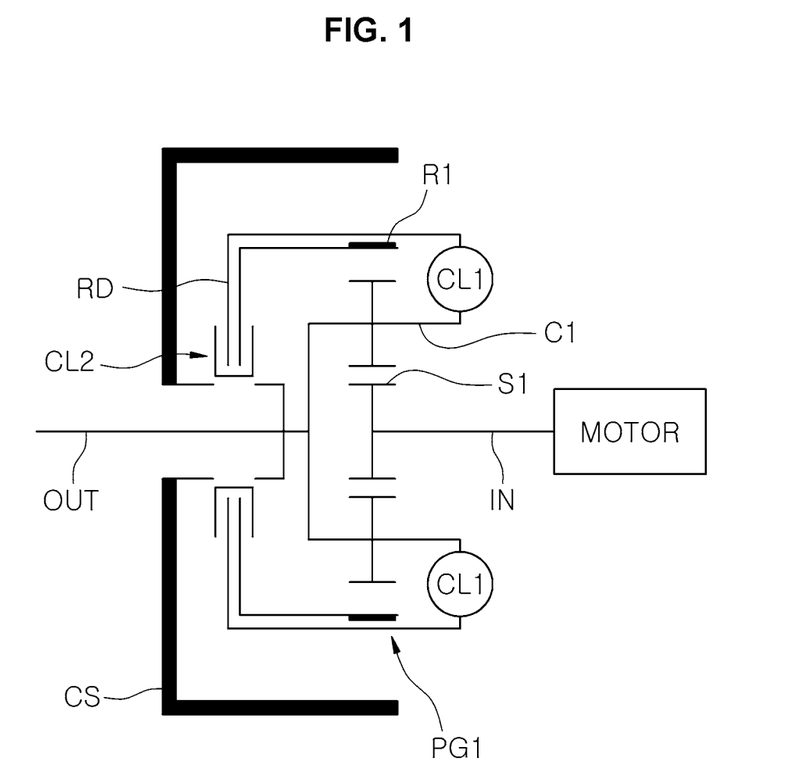
FIG. 1 is a view showing a configuration of a powertrain for a vehicle according to an exemplary embodiment of the present invention.
Figure 8:
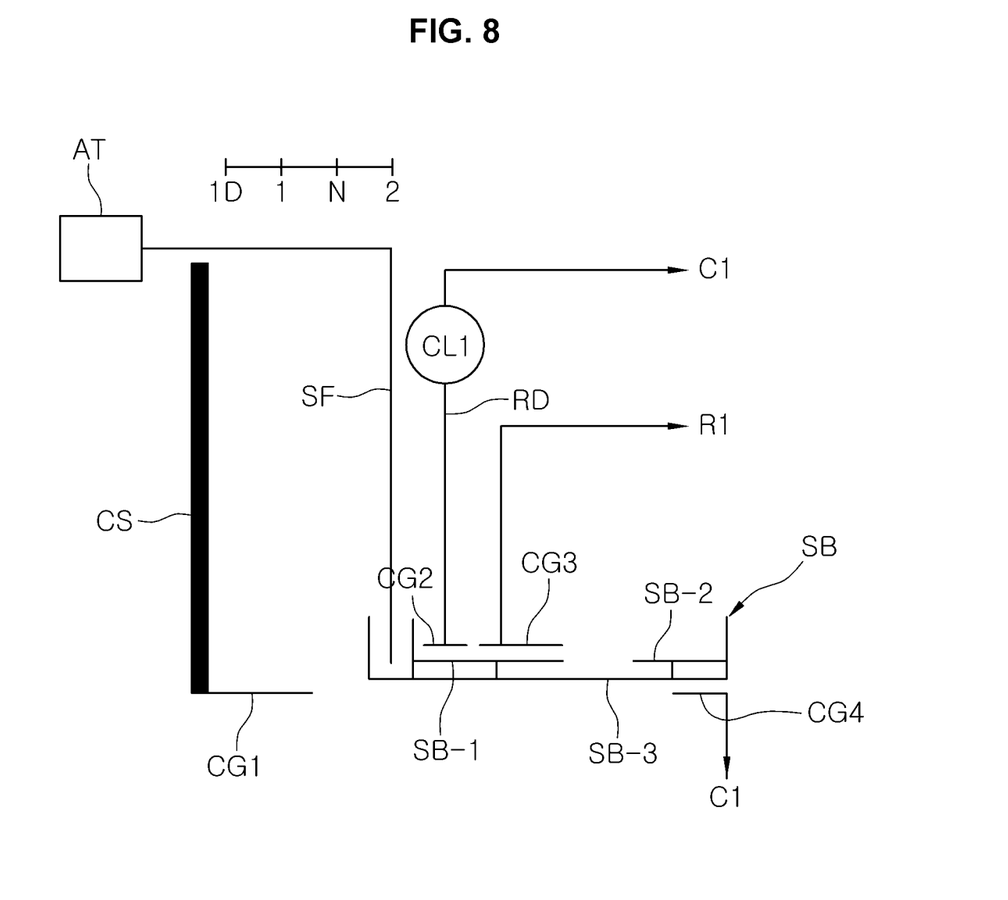
FIG. 8 is a view showing a state of the second clutch device implementing the 2 gear stage of FIG. 7.

Referring to FIGS. 1 and 8, an exemplary embodiment of a powertrain of the present invention includes: a first planetary gear set PG1 configured such that a first rotation element of three rotation elements thereof is connected to an input shaft IN; and a first clutch device CL1 and a second clutch device CL2 provided in series between a second rotation element and a third rotation element of the first planetary gear set PG1 to directly connect the second rotation element and the third rotation element, wherein the second clutch device CL2 is configured to selectively lock the third rotation element; and the second rotation element of the first planetary gear set PG1 functions as an output element of the first planetary gear set PG1.

In the exemplary embodiment of the present invention, the first planetary gear set PG1 is a single pinion simple planetary gear set, the first rotation element is a first sun gear S1, the second rotation element is a first planet carrier C1, and the third rotation element is a first ring gear R1.

In other words, in the exemplary embodiment of the present invention, the first sun gear S1 of the first planetary gear set PG1 is connected to a motor to receive power, and the first planet carrier C1 as the second rotation element is connected to an output shaft OUT as the output element.

The first clutch device CL1 is provided to be connected to the second clutch device CL2 through a rotating body RD rotating in a concentric manner with the input shaft IN, and includes a friction clutch configured to continuously vary a frictional force between the rotating body RD and the first planet carrier C1.

The second clutch device CL2 is configured to implement a state of locking the third rotation element while being connected to the first clutch device CL1 or being separated from the first clutch device CL1.

Furthermore, the second clutch device CL2 is configured to implement a state of directly connecting the second rotation element and the third rotation element with each other while the first clutch device CL1 is engaged therewith or separated therefrom.

In the exemplary embodiment of the present invention, the second clutch device CL2 includes a mesh type clutch to realize power transmission by gear engagement.

The mesh type clutch means a mechanism configured such that power transmission state is formed by gear engagement, and power is interrupted when gears are separated from each other, and may be constituted by a conventional dog clutch or synchromesh device.

In the exemplary embodiment of the present invention, the second clutch device CL2 includes a sleeve SB configured to linearly slide along an axial direction of the input shaft IN.

The sleeve SB is provided to be slidable along the axial direction of the input shaft IN by a shift fork SF driven by an actuator AT.

Of course, the actuator AT may be configured to be controlled by a controller that receives the information on the running state of the vehicle and drives the actuator AT.

Figure 2:
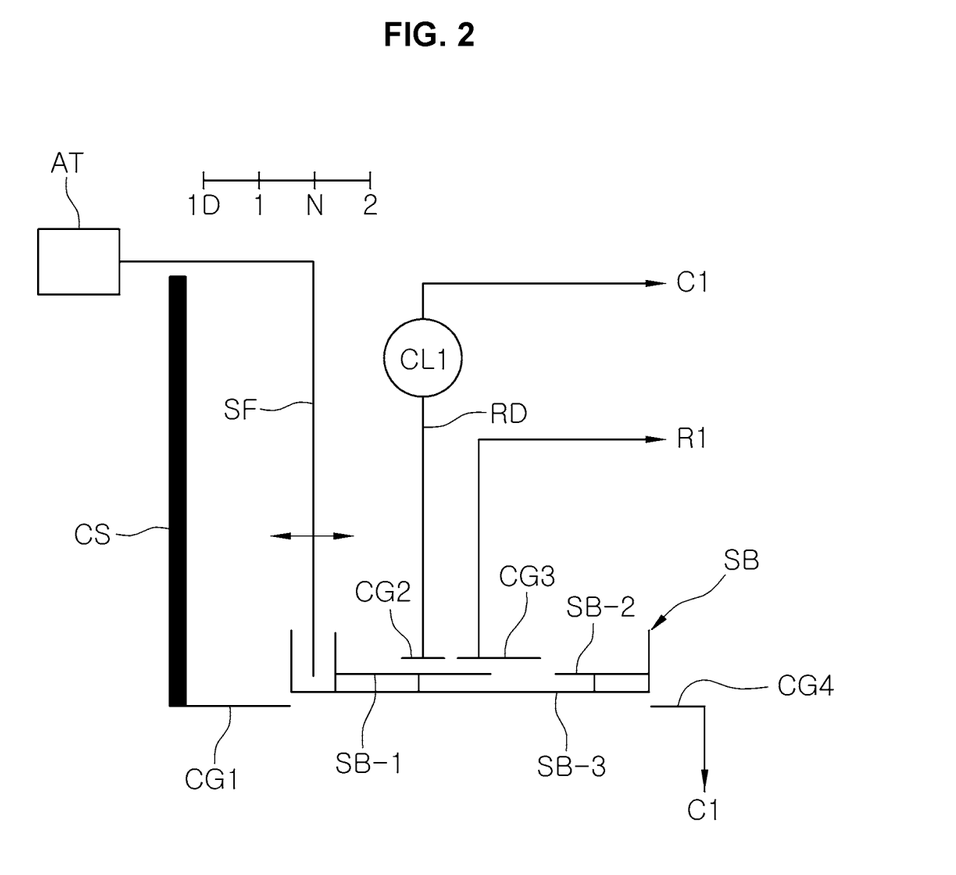
FIG. 2 is a detailed view showing a second clutch device of FIG. 1, with an N gear stage implemented.

In other words, the sleeve SB is provided to sequentially select positions of "1D-1-N-2" gear stages by linearly sliding; and the sleeve SB is configured such that an external circumferential surface thereof is provided with a first external sleeve gear SB-1 and a second external sleeve gear SB-2 disposed in a predetermined interval along the axial direction thereof, and an internal circumferential surface thereof is provided with an internal sleeve gear SB-3.

Figure 6:
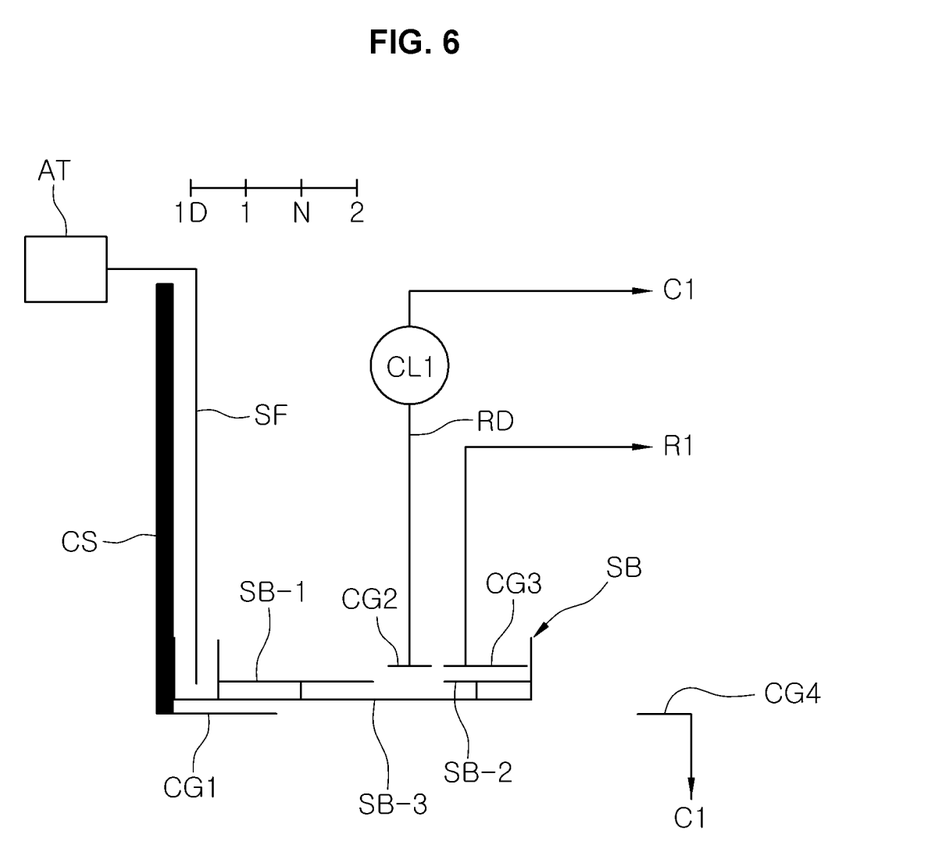
FIG. 6 is a view showing a state of the second clutch device implementing the 1D gear stage of FIG. 5.

Herein, the predetermined interval is formed to be sufficient to minimize drag generated in the first clutch device CL1 such that, when the powertrain of the present invention implements a 1D gear stage as shown in FIG. 6, a second clutch gear CG2 provided in the rotating body RD, which will be described later, is disposed between the first external sleeve gear SB-1 and the second external sleeve gear SB-2 with being engaged with neither the first external sleeve gear SB-1 nor the second external sleeve gear SB-2.

For reference, in the exemplary embodiment of the present invention, although it is shown that the internal sleeve gear SB-3 is formed in a single body, it may be configured such that a portion engaged with a first clutch gear CG1 and another portion engaged with a fourth clutch gear CG4 are separately provided.

As shown in FIG. 6, with the sleeve SB at the 1D gear stage, the internal sleeve gear SB-3 is engaged with the first clutch gear CG1 connected to a transmission housing CS, and the second external sleeve gear SB-2 is engaged with a third clutch gear CG3 connected to the first ring gear R1.

Here, the second clutch gear CG2, as described above, is in the state of being engaged with neither the first external sleeve gear SB-1 nor the second external sleeve gear SB-2 within the predetermined interval between the first external sleeve gear SB-1 and the second external sleeve gear SB-2, and the fourth clutch gear CG4 is also in the state of being released from the internal sleeve gear SB-3.

Figure 4:
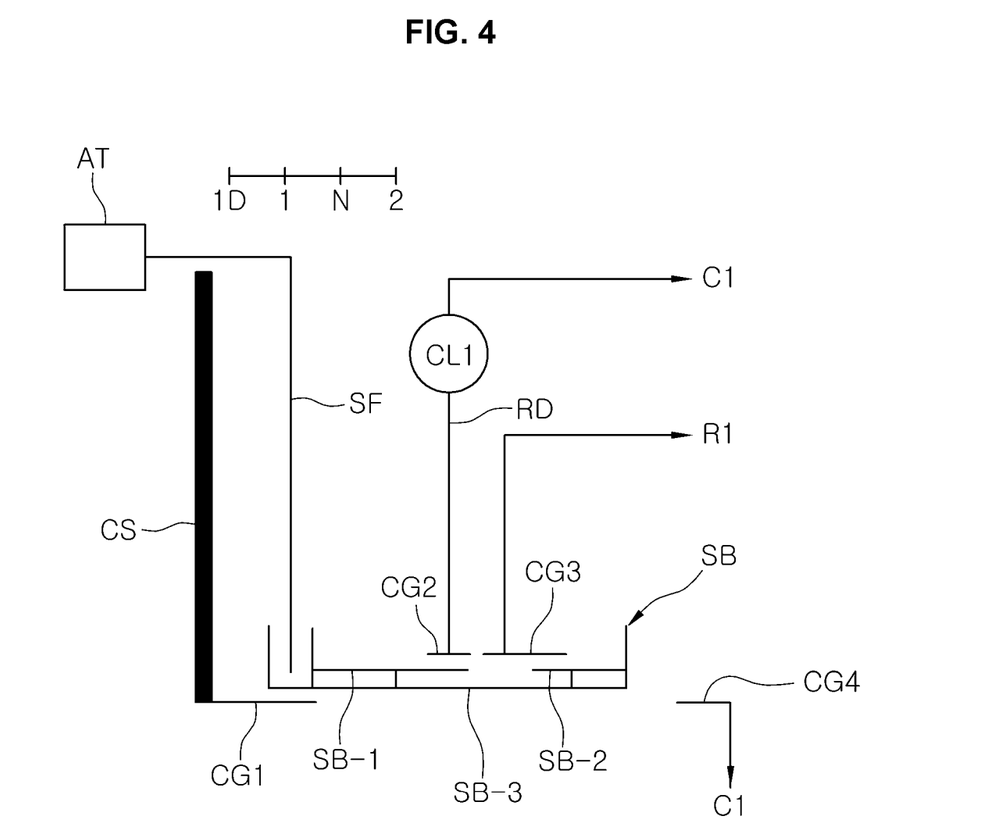
FIG. 4 is a view showing a state of the second clutch device implementing the 1 gear stage of FIG. 3.

As shown in FIG. 4, with the sleeve SB at the 1 gear stage, the internal sleeve gear SB-3 is engaged with the first clutch gear CG1, the first external sleeve gear SB-1 is engaged with second clutch gear CG2 provided in the rotating body RD, and the second external sleeve gear SB-2 is engaged with the third clutch gear CG3.

Also here, the fourth clutch gear CG4 is still released from the internal sleeve gear SB-3.

As shown in FIG. 2, with the sleeve SB at the N gear stage, the first external sleeve gear SB-1 is engaged with the second clutch gear CG2 and the third clutch gear CG3, but the internal sleeve gear SB-3 is engaged with neither the first clutch gear CG1 nor the fourth clutch gear CG4, to form the neutral state.

As shown in FIG. 8, with the sleeve SB at the 2 gear stage, the first external sleeve gear SB-1 is engaged with the second clutch gear CG2 and the third clutch gear CG3, and the internal sleeve gear SB-3 is engaged with the fourth clutch gear CG4 connected to the first planet carrier C1.

Here, the first clutch gear CG1 is fully released from the internal sleeve gear SB-3.

Reference will be made to implementation of each gear stage according to the exemplary embodiment of the present invention configured as described above.

FIG. 1 and FIG. 2 show a state where the N gear stage, that is, the neutral state is implemented, wherein as described above, the internal sleeve gear SB-3 of the sleeve SB is separated from both the first clutch gear CG1 and the fourth clutch gear CG4.

Figure 3:
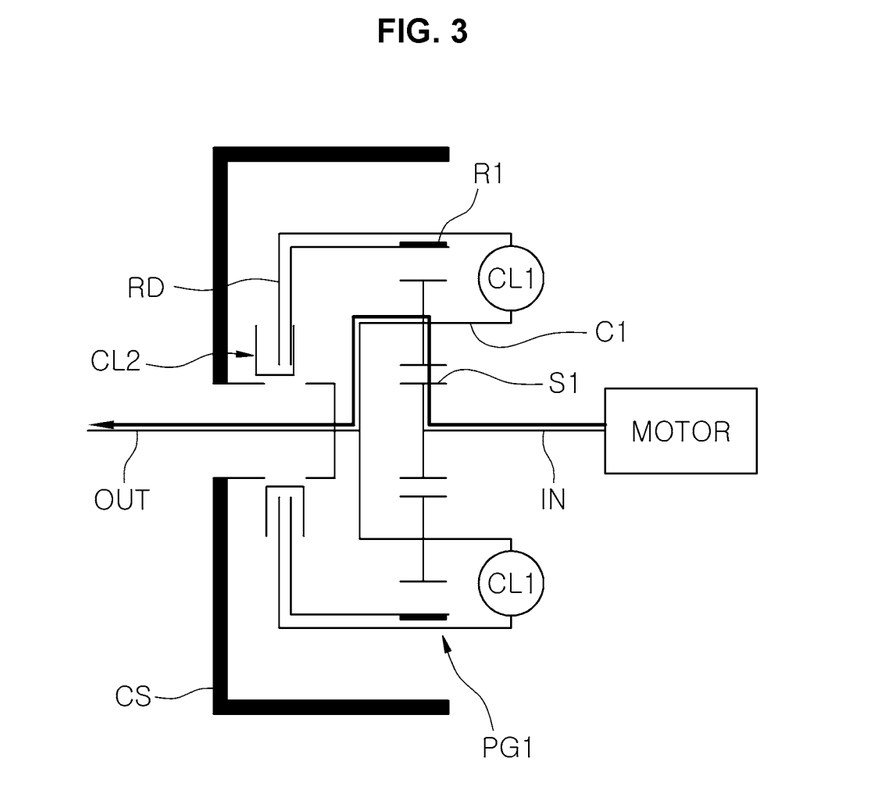
FIG. 3 is a view showing a state where the powertrain of the present invention implements a 1 gear stage.

FIG. 3 and FIG. 4 show a state where the 1 gear stage is implemented, wherein the internal sleeve gear SB-3 is engaged with the first clutch gear CG1 to restrict rotation, and the second external sleeve gear SB-2 is engaged with the third clutch gear CG3, and as a result, the first ring gear R1 connected to the third clutch gear CG3 is locked.

Accordingly, the power input to the first sun gear S1 is decelerated through the first planet carrier C1, and is output while forming the 1 gear stage.

Here, although the first clutch device CL1 is released, the rotating body RD is in the locked state by being connected to the first external sleeve gear SB-1 through the second clutch gear CG2, the first planet carrier C1 is rotated at the 1 gear stage speed, whereby the first clutch device CL1 of friction clutch structure is accompanied by drag.

The drag is consequently undesirable because it lowers the power transmission efficiency of the vehicle, and accordingly reduces gas mileage and driving range of the vehicle.

Figure 5:
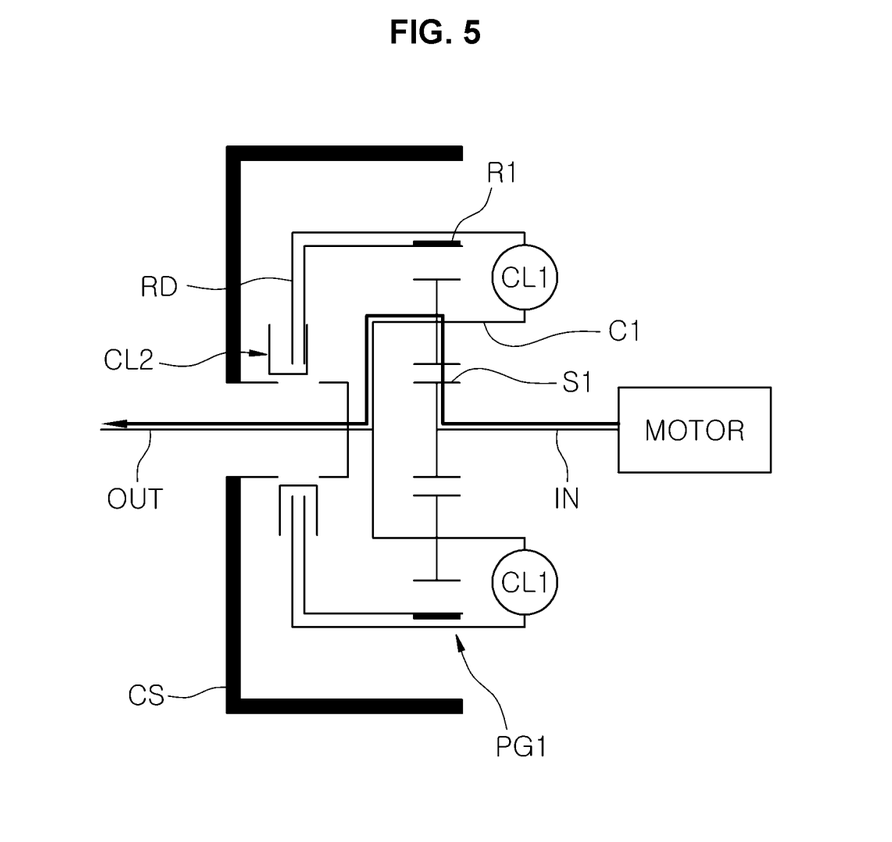
FIG. 5 is a view showing a state where the powertrain of the present invention implements a 1D gear stage.

Accordingly, in various aspects of the present invention, the above state is temporarily formed only for shifting to the 1 gear stage, and in a situation in which the vehicle must run for a long time in the 1 gear stage state, the 1D gear stage, as shown in FIG. 5 and FIG. 6, is implemented to minimize the drag.

In other words, in the state of the 1D gear stage, the internal sleeve gear SB-3 of the sleeve SB maintains the state of being engaged with the first clutch gear CG1, and the second external sleeve gear SB-2 maintains the state of being engaged with the third clutch gear CG3, but the second clutch gear CG2 is released from the first external sleeve gear SB-1 as described above and internally disposed within the predetermined interval between the first external sleeve gear SB-1 and the second external sleeve gear SB-2, so as not to forcibly lock the rotating body RD.

Accordingly, the freely rotatable state of the rotating body RD minimizes the drag of the first clutch device CL1.

Figure 7:
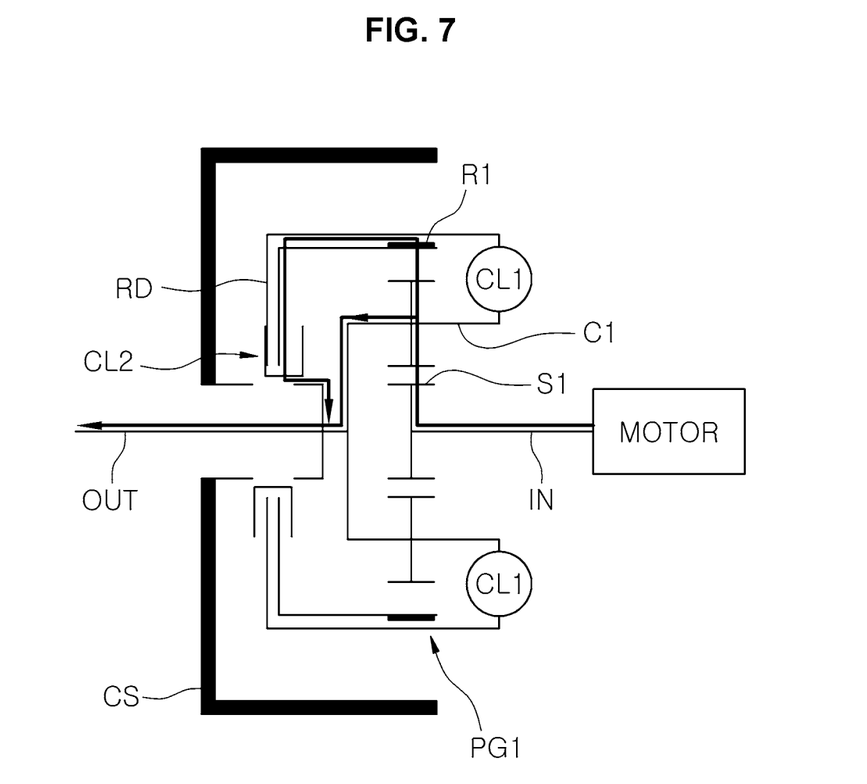
FIG. 7 is a view showing a state where the powertrain of the present invention implements a 2 gear stage.

FIG. 7 and FIG. 8 show a state where the 2 gear stage is implemented, wherein the sleeve SB is moved to the right in the drawing as much as possible, and the first external sleeve gear SB-1 is engaged with the second clutch gear CG2 and the third clutch gear CG3, and the internal sleeve gear SB-3 is engaged with the fourth clutch gear CG4, directly connecting the first ring gear R1 connected to the third clutch gear CG3 and the first planet carrier C1 connected to the fourth clutch gear CG4 with each other through the sleeve SB, and thus, the power input into the first sun gear S1 is output as an output of the 2 gear stage through the first planet carrier C1 while forming a 1:1 gear ratio.

Here, even when the first clutch device CL1 is released, the state of the 2 gear stage is ensured, and thus, it is possible to save energy required to maintain the engaged state of the first clutch device CL1 during running at the 2 gear stage, and accordingly, gas mileage and driving range of the vehicle may be improved.

When the powertrain shifts from the 1 gear stage to the 2 gear stage, firstly, the sleeve SB is moved from the 1 gear stage position to the N gear stage position, and then the first clutch device CL1 is slipped to increase the rotation speed of the first ring gear R1 and simultaneously to decrease the speed of the motor provided to input power into the first sun gear S1, being synchronized with the 2 gear stage speed. When the speed of the sleeve SB and the speed of the fourth clutch gear CG4 are synchronized by the above synchronization, the sleeve SB is moved to the state of FIG. 8, such that the internal sleeve gear SB-3 of the sleeve SB is engaged with the fourth clutch gear CG4, whereby shifting to the 2 gear stage is completed.

On the other hand, to shift from the 2 gear stage to the 1 gear stage, in the state of FIG. 8, the released first clutch device CL1 is engaged, and the sleeve SB is moved to the left, being changed to the N gear stage state, and then the first clutch device CL1 is slipped such that the speed of the first ring gear R1 is reduced to be stopped and simultaneously the speed of the motor connected to the first sun gear S1 is increased to be synchronized with the 1 gear stage speed, and the sleeve SB is changed to the 1 gear stage state, such that the internal sleeve gear SB-3 is engaged with the first clutch gear, whereby shifting to the 1 gear stage is completed.

Figure 9:
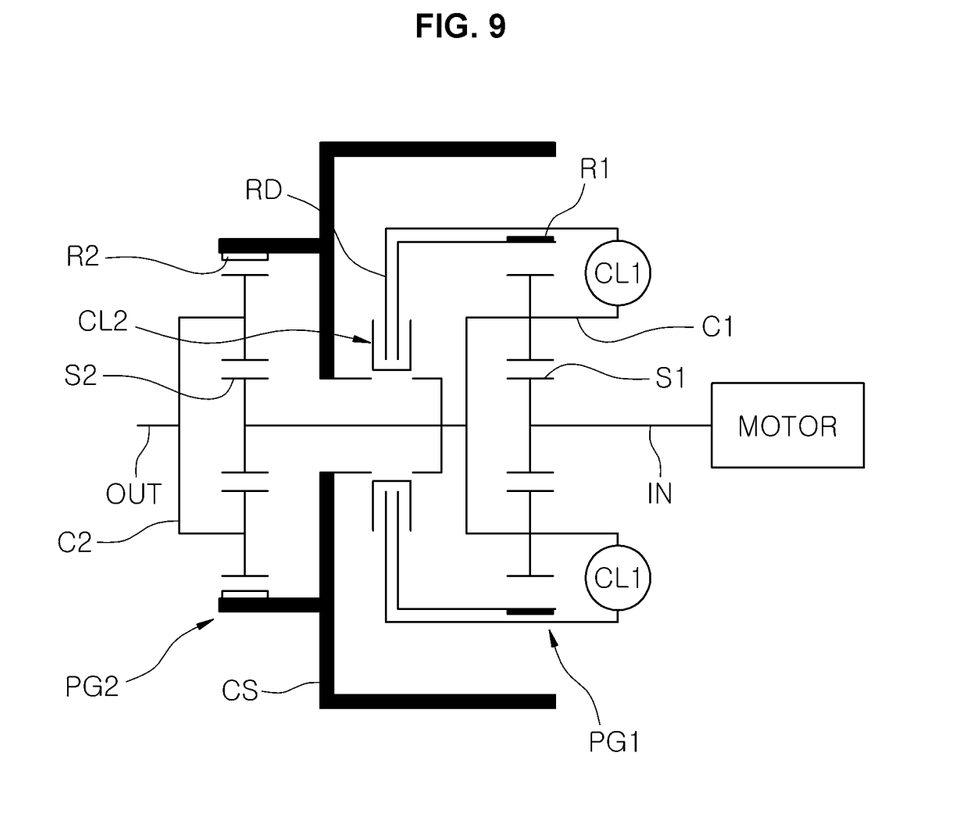
FIG. 9 is a view showing another exemplary embodiment of the present invention.

FIG. 9 is a view showing another exemplary embodiment of the present invention, wherein other configurations thereof are the same as the exemplary embodiment of FIG. 1, and the exemplary embodiment is different in that a second planetary gear set PG2 is additionally connected to the first planet carrier C1 as the output element of the first planetary gear set PG1, which is configured such that: the motor is connected to the input shaft IN; a second sun gear S2 of the second planetary gear set PG2 is connected to the first planet carrier C1; the transmission housing CS is fixed to a second ring gear R2 of the second planetary gear set PG2; and a second planet carrier C2 of the second planetary gear set PG2 functions as an output element of the second planetary gear set PG2, whereby a final output is implemented by the second planet carrier C2.

Herein, the second planetary gear set PG2 simply functions as a reducer, and is useful when additional deceleration is required depending on the specification and type of the motor.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A powertrain for a vehicle, the powertrain comprising:
a first planetary gear set having at least three rotation elements of a first rotation element,
a second rotation element, and a third rotation element, wherein the first rotation element of the first planetary gear set is connected to an input shaft; and
a first clutch device and a second clutch device provided in series between the second rotation element and the third rotation element of the first planetary gear set to selectively connect the second rotation element of the first planetary gear set and the third rotation element of the first planetary gear set directly,
wherein the second clutch device is configured to selectively lock the third rotation element,
wherein the second rotation element of the first planetary gear set is an output element of the first planetary gear set, and
wherein only when both of the first clutch device and the second clutch device are engaged, the second rotation element of the first planetary gear set and the third rotation element of the first planetary gear set are directly connected.

2. The powertrain of claim 1, wherein the second clutch device is configured to selectively implement a state of locking the third rotation element of the first planetary gear set while being connected to the first clutch device or being released from the first clutch device.

3. The powertrain of claim 2, wherein the second clutch device is configured to implement a state of directly connecting the second rotation element of the first planetary gear set and the third rotation element of the first planetary gear set with each other while the first clutch device is engaged therewith or released therefrom.

4. The powertrain of claim 1,
wherein the first planetary gear set includes a single pinion planetary gear set, and
wherein the first rotation element of the first planetary gear set includes a first sun gear, the second rotation element of the first planetary gear set includes a first planet carrier, and the third rotation element of the first planetary gear set includes a first ring gear.

5. The powertrain of claim 4,
wherein the first clutch device is provided to be connected to the second clutch device through a rotating body rotating concentrically with the input shaft, and
wherein the first clutch device includes a friction clutch configured to continuously vary a frictional force between the rotating body and the first planet carrier of the first planetary gear set.

6. The powertrain of claim 5,
wherein the second clutch device includes a sleeve configured to selectively slide along an axial direction of the input shaft linearly,
wherein the sleeve is provided to sequentially select a position of an additional first gear (1D) stage, a first gear (1) stage, a neutral gear (N) stage and a second gear (2) stage by linearly sliding, and
wherein the sleeve includes:
an external circumferential surface is provided with a first external sleeve gear and a second external sleeve gear disposed in a predetermined interval along an axial direction of the sleeve; and
an internal circumferential surface provided with an internal sleeve gear.

7. The powertrain of claim 6,
wherein with the sleeve at the 1D stage, the internal sleeve gear is engaged with a first clutch gear fixedly connected to a transmission housing and disengaged with a fourth clutch gear connected to the first planet carrier of the first planetary gear set, and the second external sleeve gear is engaged with a third clutch gear fixedly connected to the first ring gear of the first planetary gear set,
wherein with the sleeve at the 1 stage, the internal sleeve gear is engaged with the first clutch gear and disengaged with the fourth clutch gear, the first external sleeve gear is engaged with a second clutch gear provided in the rotating body, and the second external sleeve gear is engaged with the third clutch gear,
wherein with the sleeve at the N stage, the internal sleeve gear is disengaged with the first clutch gear and the fourth clutch gear, the first external sleeve gear is engaged with the second clutch gear and the third clutch gear, and the second external sleeve gear is disengaged with the third clutch gear, and
wherein with the sleeve at the 2 stage, the first external sleeve gear is engaged with the second clutch gear and the third clutch gear, the second external sleeve gear is disengaged with the third clutch gear, and the internal sleeve gear is disengaged with the first clutch gear and is engaged with the fourth clutch gear.

8. The powertrain of claim 6, wherein the sleeve is slidable along the axial direction of the input shaft by a shift fork driven by an actuator.

9. The powertrain of claim 5, wherein the second clutch device includes a mesh type clutch to realize power transmission by a gear engagement.

10. The powertrain of claim 4, wherein a motor is connected to the input shaft.

11. The powertrain of claim 4, further comprising:
a second planetary gear set including a single pinion planetary gear set, and having at least three rotation elements of a first rotation element, a second rotation element, and a third rotation element,
wherein the first rotation element of the second planetary gear set is fixedly connected to the second rotation element of the first planetary gear set,
wherein the third rotation element of the second planetary gear set is fixedly connected to a transmission housing, and
wherein the second rotation element of the second planetary gear set which is engaged with the first rotation element of the second planetary gear set and the second rotation element of the second planetary gear set is an output element of the second planetary gear set.

12. The powertrain of claim 11,
wherein the first rotation element of the second planetary gear set includes a second sun gear, the second rotation element of the second planetary gear set includes a second planet carrier, and the third rotation element of the second planetary gear set includes a second ring gear.

13. The powertrain of claim 11, wherein a motor is connected to the input shaft.

* * * * *